United States Patent [19]

St. Martin

[11] Patent Number: 5,409,026

[45] Date of Patent: * Apr. 25, 1995

[54] PRODUCE WASHER HAVING SPRAY DISCHARGING ORIFICES

[76] Inventor: Marty St. Martin, 613 E. Grand Ave., Fruita, Colo. 81521

[*] Notice: The portion of the term of this patent subsequent to Oct. 25, 2011 has been disclaimed.

[21] Appl. No.: 289,912

[22] Filed: Aug. 12, 1994

Related U.S. Application Data

[62] Division of Ser. No. 951,167, Sep. 25, 1992, Pat. No. 5,357,993.

[51] Int. Cl.[6] .................................................. B08B 3/02
[52] U.S. Cl. .................................................. 134/111
[58] Field of Search ............... 134/111, 180, 181, 199, 134/200, 25.3

[56] References Cited

U.S. PATENT DOCUMENTS

| | | | |
|---|---|---|---|
| 2,249,792 | 7/1941 | Skinner | 134/25.3 X |
| 2,292,240 | 8/1942 | Platt et al. | 146/194 |
| 3,067,759 | 12/1962 | Guth et al. | 134/176 |
| 3,135,272 | 6/1964 | Brollo | 134/57 |
| 4,197,016 | 4/1980 | Winterhalter et al. | 366/165 |
| 4,443,111 | 4/1984 | André | 366/165 |
| 4,744,379 | 5/1988 | Goettel | 134/109 |

FOREIGN PATENT DOCUMENTS 569906 6/1945 United Kingdom .

Primary Examiner—Philip R. Coe
Attorney, Agent, or Firm—Cahill, Sutton & Thomas

[57] ABSTRACT

Produce, whether vegetable and/or fruit, is supported upon a screen basket suspended within a closed cabinet. Each of a plurality of nozzles disposed about the basket emits a filled cone of washing liquid to scour the produce and to dislodge by agitation and flotation debris therefrom. After filtering of the washing fluid through a screen in the cabinet, the washing fluid is recycled by a pump pumping the washing fluid from a collection trough to the nozzles. Preferably, the washing fluid is slightly acidic.

17 Claims, 3 Drawing Sheets

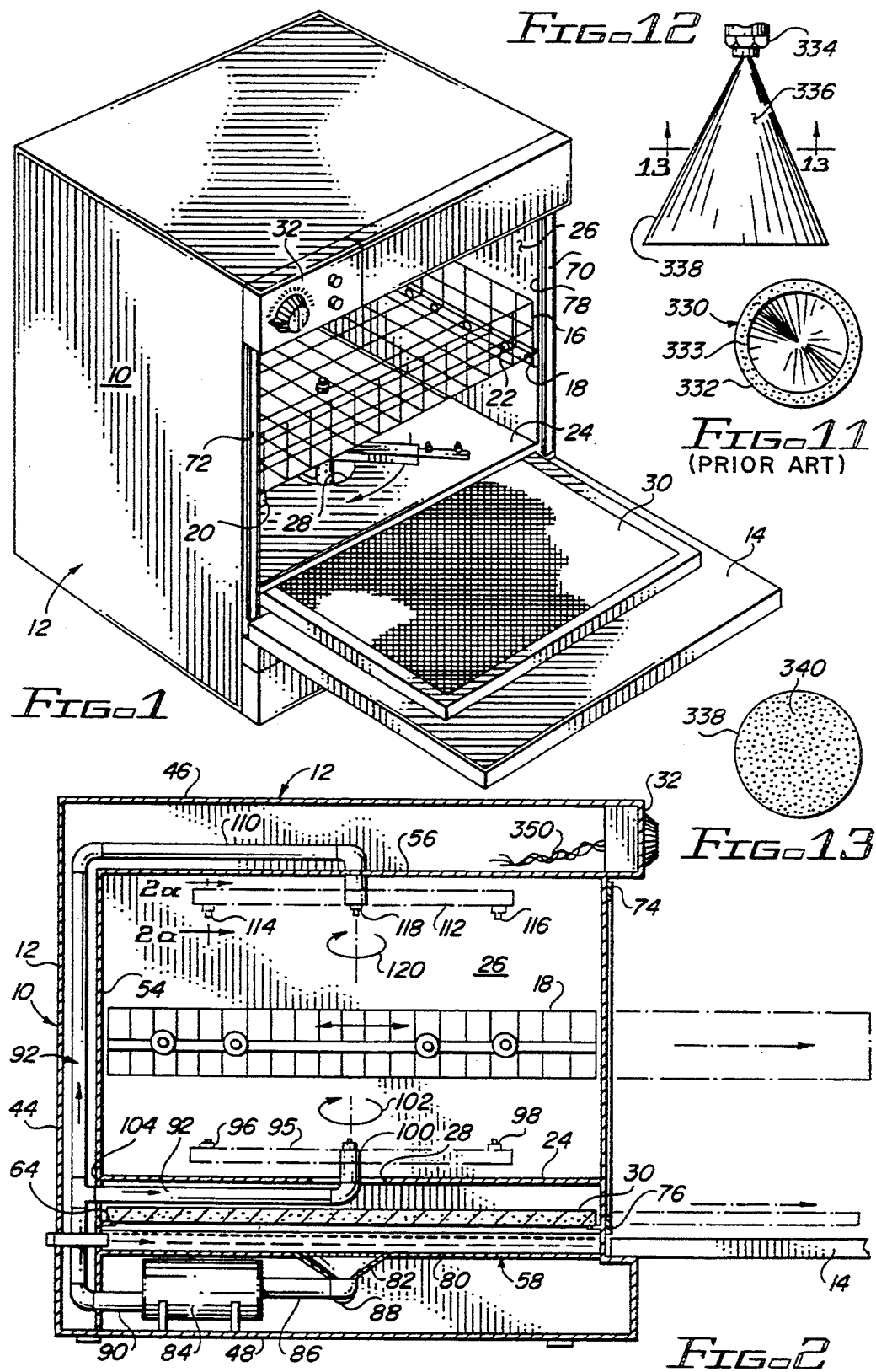

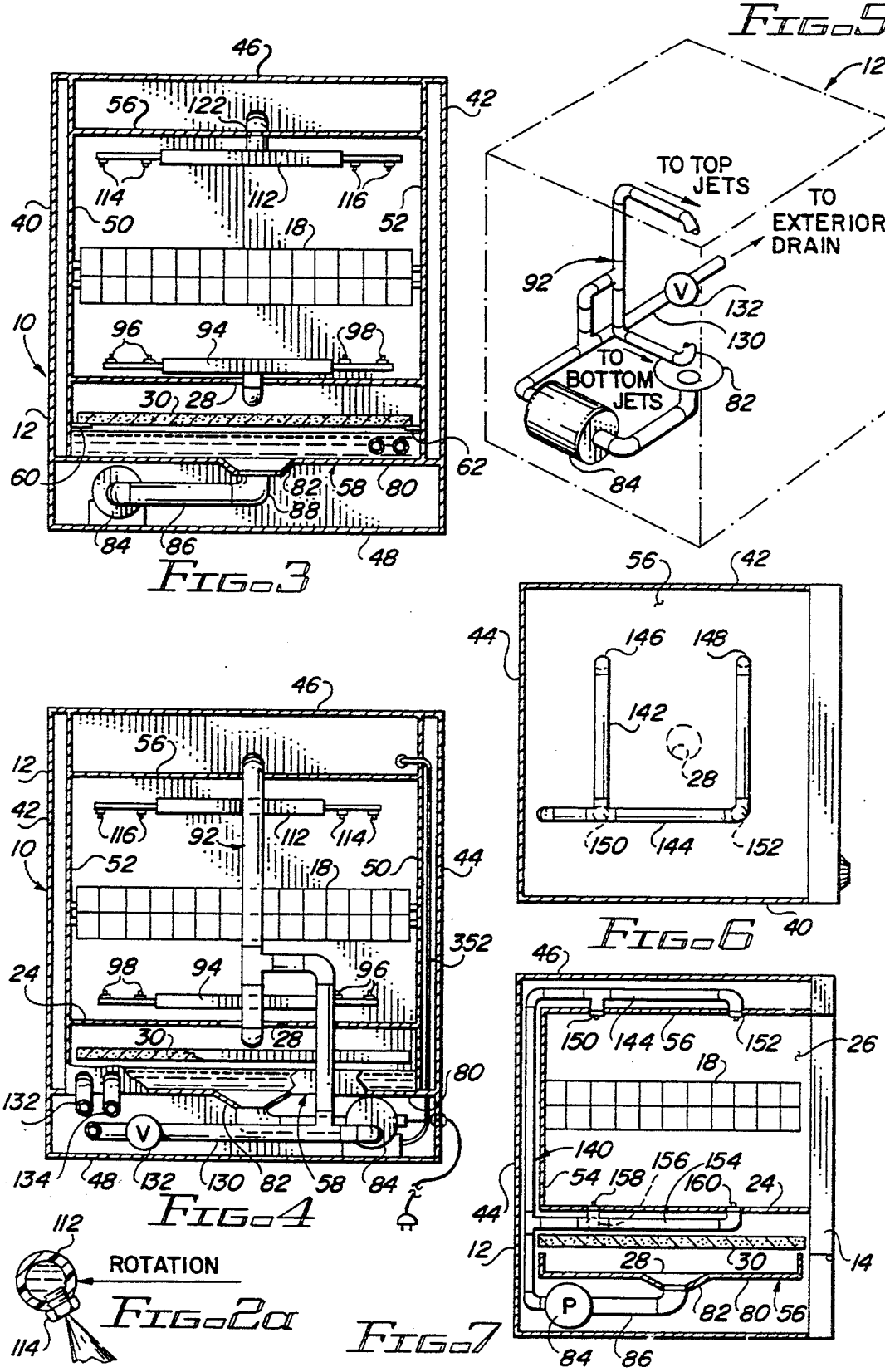

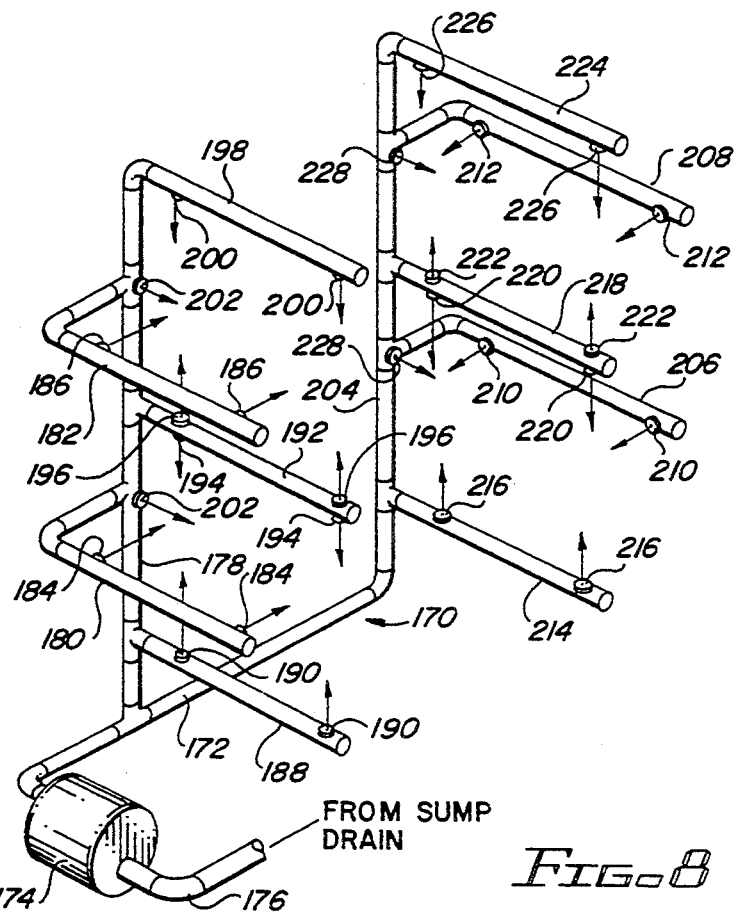
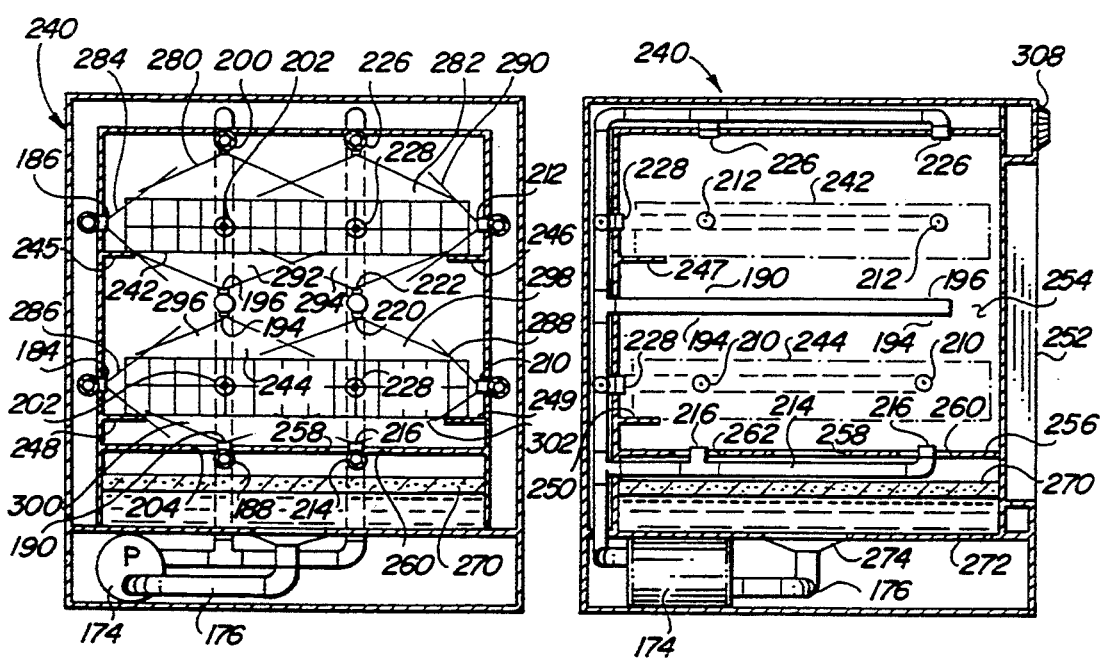

PRODUCE WASHER HAVING SPRAY DISCHARGING ORIFICES

This is a divisional of application Ser. No. 07/951,167 entitled "PRODUCT WASHER" filed on Sep. 25, 1992, and now U.S. Pat. No. 5,357,993.

BACKGROUND OF THE INVENTION

1. Field of the Invention

The present invention relates to washing apparatus and, more particularly, to apparatus for washing produce.

2. Description of Related Art

Washing machines for crockery have been available for years. Such machines provide racks for supporting the crockery on edge or inverted to encourage drip drying after the washing process. The cleaning function is performed in part by a plurality of nozzles, whether stationary or moveable, which a spray pattern of fine water droplets in the form of a hollow expanding cone with a relatively high impact force. The washing function is substantially aided by the use of very hot water and the chemical deterging and degreasing properties of a cleaning agent.

For produce, including fruits and vegetables, a spray providing fine water droplets having a substantial impact force would bruise or damage the produce and such sprays must be precluded. The use of a cleansing agent to wash produce would leave an unacceptable after taste unless extraordinary and time consuming rinsing were incorporated. Moreover, the cleaning agent may produce an unacceptable chemical reaction with the produce that would result in deterioration or damage of the produce. Finally, a high temperature washing fluid would wilt or otherwise damage the produce.

The produce washers known provide a swirling immersion bath that provides a gentle rinse to the produce to prevent damage and deterioration. Unfortunately, such gentle rinsing fails to clean the crevices, interstices and other surface perturbations of the produce. Moreover, debris lodged within folds, in depressions or in cavities is usually not removed. Thus, such produce washers are primarily used for an initial washing operation to be followed by hand washing prior to presenting the produce for cooking or eating. Manually operated produce washers are also known and are effective to the extent an operator diligently directs the washing fluid on and about the produce.

SUMMARY OF THE INVENTION

Produce is loaded upon a basket of mesh material placed within a closeable cabinet. A plurality of nozzles, which nozzles may be fixed or movable, are located above and below and possibly on the sides of the basket to direct sprays of washing fluid onto the produce; preferably, the washing fluid is slightly acidic. The nozzles are configured to provide a non hollow expanding cone spray pattern to provide relatively large but slow moving droplets to gently agitate and to scour the produce surfaces impinged. The large droplets tend to dislodge, float and convey any liquid or solid debris on the produce. Because of the relatively low impact forces of the droplets, soft surface produce, such as strawberries, may be washed equally as well as hard surfaced produce, such as celery. The washing fluid containing debris is filtered and collected in a trough. A pump recycles the washing fluid from the trough through the nozzles for a period of time sufficient to complete the washing process. After washing is complete, the washing fluid is discharged. A rinsing fluid, such as tap water, is sprayed onto the produce to rinse the produce and remove any residual washing fluid or debris.

It is therefore a primary object of the present invention to provide a washer for washing produce of any type.

Another object of the present invention is to provide a produce washer for washing robust and tender produce with equal effectiveness and without damage.

Yet another object of the present invention is to provide a produce washer for simultaneously washing a mixture of different produce.

Still another object of the present invention is to provide a produce washer for recycling the washing fluid.

A further object of the present invention is to provide a plurality of nozzles for omnidirectionally spraying produce with a washing fluid.

A yet further object of the present invention is to provide stationary and moveable nozzles for spraying produce with a washing fluid.

A still further object of the present is to provide a produce washer having a plurality of nozzles for emitting an expanding non hollow cone of droplets of washing fluid.

A still further object of the present invention is to provide a produce washer for washing produce of various kinds during a washing cycle and for rinsing the washed produce during a rinse cycle.

A still further object of the present invention is to provide a method for washing produce.

These and other objects of the present invention will become apparent to those skilled in the art as the description of the present invention proceeds.

BRIEF DESCRIPTION OF THE DRAWINGS

The present invention will be described with greater specificity and clarity with reference to the following drawings, in which:

FIG. 1 illustrates a cabinet housing a produce washer;

FIG. 2 is a cross sectional side view of the produce washer illustrated in FIG. 1;

FIG. 2a is a cross sectional view taken along lines 2a—2a illustrated in FIG. 2;

FIG. 3 is a partial cross sectional front view of the produce washer illustrated in FIG. 1;

FIG. 4 is a partial cross sectional rear view of the produce washer illustrated in FIG. 1;

FIG. 5 is a representative illustration of the plumbing for the washing fluid of the produce washer;

FIG. 6 is a partial top view of the plumbing interconnecting certain nozzles;

FIG. 7 is a partial side view illustrating the plumbing for top and bottom nozzles;

FIG. 8 is a partial view of the plumbing for a plurality of top, bottom and side mounted nozzles;

FIG. 9 is a partial cross sectional view illustrating the spray patterns of the nozzles depicted in FIG. 8;

FIG. 10 is a partial cross sectional side view of the nozzles illustrated in FIG. 9;

FIG. 11 is a cross sectional view of a conventional hollow expanding cone spray pattern of a conventional nozzle; and FIG. 12 illustrates the spray pattern of the nozzles used in the produce washer; and FIG. 13 is a cross sectional view taken along lines 13—13, as shown in FIG. 12 and illustrating the spray pattern of the nozzles used with the produce washer.

DESCRIPTION OF THE PREFERRED EMBODIMENT

A produce washer 10 housed within a cabinet 12 is illustrated in FIG. 1. The cabinet includes a closeable door 14 for providing access to the interior of the cabinet to load and unload the produce to be washed. A basket 16, formed of a mesh or other easily water permeable material supports and contains the produce to be washed. The basket is mounted upon opposed ledges 18, 20, which ledges may include rollers 22 or similar devices to assist in sliding the basket into and out of cabinet 10. A shelf 24 extends across the lower end of compartment 26 defined by cabinet 10; the shelf may include one or more substantially sized holes or apertures 28 to accommodate drainage of washing fluid. A filter 30 is removably lodged or mounted beneath shelf 24 to filter debris from the washing fluid flowing through aperture 28. Preferably, a cutout switch (not shown), such as a magnetic switch, is enabled upon mounting of the filter to prevent operation of the produce washer unless the filter is in place. A control panel 32 is mounted on the exterior of cabinet 10 to provide start, stop and other controls for operation of produce washer 10. Moreover, it may include timers to vary the time of fluid flow, pressure controls in combination with pressure gauges to vary the pressure of the fluid flow, and flow controls to vary the quantity of fluid recycled.

Referring jointly to FIGS. 2, 3 and 4, further details of produce washer 10 will be described. Cabinet 12 includes side walls 40, 42, rear wall 44, top 46 and bottom 48. Compartment 26 is defined by false side walls 50, 52, false rear wall 54, false top 56 and false bottom 58. The spaces intermediate compartment 26 and cabinet 12 are used for routing plumbing and electrical conduits, as illustrated in part in FIGS. 2, 3 and 4.

Filter 30 is supported upon shoulders 60, 62 extending inwardly from false side walls 50, 52. A further shoulder 64 for supporting the rear edge of the filter may extend from false rear side wall 54. Upon closing of door 14, the door engages seals 70, 72, 74 and 76 extending about opening 78 to compartment 26. Thereby, upon closing the door, compartment 26 will become essentially watertight. False bottom 58 serves in the manner of a trough 80 to collect the washing fluid. It includes a downwardly extending cone shaped drain 82 for discharging the water. An electrically actuated pump 84 includes a conduit 86 extending from inlet 88 in fluid communication with drain 82 to draw water from trough 80. Outflow from pump 84 is conveyed via conduit 90 to a conduit tree 92 for discharging water through a plurality of outlets or nozzles into compartment 26. Conduit 94 of the conduit tree extends beneath shelf 24 and upwardly through aperture 28. An arm 95, including nozzles 96, 98 is rotatably mounted at the end of conduit 92 to locate the arm within compartment 26 and beneath basket 18. Mounting 100 accommodates rotatable movement of arm 95 and also accommodates flow of washing fluid from within conduit 92 into the arm for expulsion through nozzles 96, 98. The spray pattern of the nozzles is directed upwardly into basket 18. Conduit 110 of conduit tree 92 conveys washing fluid through an aperture in false top 56. An arm 112, supporting nozzles 114, 116 is rotatably mounted by mounting 118 at the terminal end of conduit 110. The mounting accommodates rotation of the arm and accommodates flow of washing fluid from conduit 110 into the arm for expulsion through nozzles 114, 116. The washing fluid sprayed from the nozzles is directed downwardly into basket 18. Nozzles 96, 98 are mounted upon arm 95 at an angle of the vertical axis to provide a reaction force upon expulsion of the washing fluid to induce rotation of the arm, as depicted by arrow 102. Similarly, nozzles 114, 116 are mounted at an angle off the vertical axis to provide a reaction force upon expulsion of washing fluid to induce rotation of the arm, as depicted by arrow 120. The canting of the nozzles is represented by canted nozzle 114 attached to arm 112 as depicted in FIG. 2a. As particularly depicted in FIGS. 3 and 4, a plurality of nozzles 96 and 98 may be mounted upon arm 95. Similarly, a plurality of nozzles 114, 116 may be mounted upon arm 112. It is understood that a seal 122 may be disposed between conduit 110 and false top 56 to preclude water flow therebetween. Similarly, a seal 104 may be disposed about conduit 92 in false rear wall 54 to prevent water flow therebetween.

As particularly illustrated in FIGS. 3, 4 and 5, conduit tree 92 may include a drain conduit 130 and valve 132 controlling outflow through the drain conduit. Thereby, pump 84 may also be used to drain trough 80 on completion of a washing cycle. Water inlets 132, 134 are in fluid communication with trough 80 to accommodate inflow of washing fluid. One of these inlets may be connected to a source of water at ambient temperature and the second inlet may be connected to a source of chilled water at a predetermined temperature. Alternatively, one of the inlets may be used to introduce an additive, such as a weak acidic solution which is beneficial for cleaning various types of produce.

Referring to FIGS. 6 and 7, there is illustrated an alternate embodiment of conduit tree 92 which conduit tree 140 provides a plurality of fixed nozzles for spraying a washing fluid upon the produce to be washed. The conduit tree includes arms 142, 144 terminating in nozzles 146, 148, respectively. A further nozzle 150 is disposed at the junction of the arms and a nozzle 152 is disposed at the bend of arm 144. Each of these nozzles extends through false top 56 in sealing engagement therewith to prevent water flow upwardly therebetween. Nozzles 146, 148, 150 and 152 direct washing fluid downwardly into basket 18 within compartment 26. Similarly configured arms 154, 156 are disposed beneath shelf 24 and support four nozzles in the manner of arms 142, 144 and of which nozzles 158, 160 are illustrated. The four nozzles extending through shelf 24 emit an upwardly directed spray of washing fluid into basket 18.

A complex conduit tree 170 is illustrated in FIGS. 8, 9 and 10. A conduit tree of this type provides a plurality of downwardly directed nozzles, upwardly directed nozzles, inwardly directed nozzles from opposed sides and nozzles located within compartment 26 to spray water both upwardly and downwardly simultaneously. A complex conduit tree of this type is particularly useful when a pair of spaced apart baskets (242, 244) are located in the compartment within the cabinet. Conduit tree 170 includes a manifold 172 connected to the outlet of pump 174, which pump draws washing fluid from a trough at the bottom of the cabinet through inlet conduit 176. An upright conduit 178 extends from manifold conduit 172 and supports laterally located arm conduits 180, 182. Arm conduit 180 supports one or more laterally directed nozzles 184. Similarly, arm conduit 182 supports one or more laterally directed nozzles 186. An arm conduit 188 extends from upright conduit 178 and supports one or more upwardly directed nozzles 190. Another arm conduit 192 extends from upright conduit 178 and supports one or more downwardly directed nozzles 194 and one or more upwardly directed nozzles 196. A further arm conduit 198 extends from upright conduit 178 and supports one or more downwardly directed nozzles 200. Nozzles 202 may be mounted upon upright conduit 178 to direct washing fluid laterally. An upright conduit 204 extending from manifold conduit 172, supports lateral arm conduits 206, 208. One or more nozzles 210 may be mounted upon lateral arm conduit 206 to direct washing fluid laterally. Similarly, one or more nozzles 212 are supported by lateral arm conduit 208 to direct washing fluid laterally. Arm conduit 214 extends from upright conduit 204 and supports one or more nozzles 216 to direct washing fluid upwardly. Arm conduit 218 extends from upright conduit 204 and supports one or more nozzles 220 to direct washing fluid downwardly and one or more nozzles 222 to direct washing fluid upwardly. Arm conduit 224 also extends from upright conduit 204 and includes one or more nozzles 226 to direct washing fluid downwardly. One or more nozzles 228 may be disposed along upright conduit 204 to direct washing fluid laterally.

FIGS. 9 and 10 illustrate a cabinet 240 for housing a conduit tree, such as conduit tree 170 illustrated in FIG. 8, and a pair of baskets 242, 244. Basket 242 may be supported upon ledges 245, 246 and rear ledge 247 and basket 244 may be supported upon leges 248,249 and rear ledge 250. A door 252 provides access to interior compartment 254 defined by false side walls, top and bottom, as described above with reference to cabinet 12. A shelf 256 includes a central aperture 258 to accommodate drainage of the washing fluid. Additional apertures, of which apertures 260, 262 and 264 are shown, may encircle nozzles 190, 216 extending upwardly from arms 188, 214, respectively. Washing fluid flowing through the apertures in shelf 256 is filtered by filter 270. A trough 272 is disposed beneath the filter to catch and collect drained washing fluid. A cone 274 provides for discharge of the washing fluid from trough 272 into inlet conduit 176 and to pump 174. As illustrated in FIGS. 9 and 10, the conduits forming conduit tree 170 may be disposed in the spaces between the false walls defining compartment 254 and the exterior walls of cabinet 240. Preferably, seals are provided about each of the nozzles penetrating the walls of compartment 254 to preclude inadvertent water flow therebetween.

As particularly noted in FIGS. 8 and 9, nozzles 200 provide a cone of spray 280 downwardly upon and into 242. A similar cone of spray 282 is provided by nozzles 226. A cone of spray 284 is provided by nozzles 186 laterally upon and into basket 242. Nozzles 184 provide a cone of spray 286 laterally upon and into basket 244. Nozzles 210 provide a cone of spray 288 laterally upon and into basket 244. Nozzles 212 provide a cone of spray 290 laterally and upon basket 242. Nozzles 196 provide an upwardly directed cone of spray 292 upon and into the bottom of basket 242. Nozzles 222 provide an upwardly directed cone of spray 294 upon and into the bottom of basket 242. Nozzles 194 provide a cone of spray 296 upon and into the top of basket 244. Nozzles 220 provide a cone of spray 298 upon and into the top of basket 244. Upper ones of nozzles 202 provide a cone of spray laterally and forwardly upon and into the rear of basket 242. Similarly, upper ones of nozzles 228 provide a lateral cone of spray upon and into the rear of basket 242. Lower ones of nozzles 202 provide a lateral cone of spray upon and into the rear of basket 244. Similarly, the lower ones of nozzles 228 provide a cone of spray laterally upon and into the rear of basket 244. Nozzles 190 provide a cone of spray 300 directed upwardly upon and into the bottom of basket 244. Nozzles 216 provide a cone of spray 302 directed upwardly upon and into the bottom of basket 244.

Upon inspection, it will become evident that the nozzles attendant conduit tree 170 spray both baskets 242, 244 from the top, bottom the opposed sides and the rear. Such deluge of water will provide the requisite agitation and scouring action to cleanse debris from the produce supported by or located within the baskets. Any dislodged debris flows with the washing fluid downwardly by gravity through the apertures in shelf 256 onto filter 270. The filter filters the debris from the washing fluid and the filtered washing fluid is collected within trough 272. Pump 274 draws the filtered washing fluid from the trough and forces expulsion of the filtered washing fluid through the nozzles. Such washing action will continue for a predetermined time, as set by the controls located upon control panel 308.

Subsequent to draining of the washing fluid on completion of a washing cycle, a quantity of fresh water or rinse solution is introduced to the trough. The fresh water or rinse solution is pumped through the conduits and nozzles onto the produce to wash away and rinse any residual washing or cleaning solution from the produce.

Conventional nozzles of the type used for cleansing items with water or liquid spray emit a cone shaped spray pattern 330 which is hollow, as illustrated in FIG. 11. Any item intercepting the spray pattern will have impinged thereupon an annular band 332 of water or washing fluid. Generally, the droplets 333 forming the spray are relatively small sized and travelling at a relatively high rate. The resulting kinetic energy of each droplet is relatively high. Because the area of the droplet impinging upon the item to be washed is relatively small, the force, in pounds per square inch, imposed by the droplet is relatively high. For crockery and the like, the destructive effect of this force is inconsequential. For soft tissue items, such as produce, including strawberries, other berries, lettuce, etc., bruising and tissue damage will occur. To obtain a relatively large mass of water or washing fluid impinging upon the item to be washed per unit of time requires a relatively high velocity of the hollow cone shaped spray pattern. The higher velocity or flow rate will contribute to washing or flooding to help convey debris and other foreign matter but the likelihood of damage to delicate and soft tissue items being washed due to the increased force of the spray pattern is exacerbated.

To avoid the actual and potential damage to soft tissue items being washed, such as fruits and vegetables, nozzles 334 of the type illustrated in FIG. 12 have a spray pattern 336 defining an expanding cone 338 and are used with the produce washers described above. The spray cone is not hollow as shown by spray pattern 330 illustrated in FIG. 11 emanating from a conventional nozzle. Instead, expanding cone 338 is filled with randomly distributed droplets 340 emanating from nozzle 334. For a given flow rate from each of nozzles 334 and the conventional nozzle producing hollow cone shaped pattern 330, the axial flow rate per area of droplets 340 within the area defined by cone 338 is substantially less than the flow rate per area of the droplets within the area defined by annular band 332. This reduced flow rate per area of nozzle 334 over that of conventional nozzles will result in impingement upon the item being washed at a lower force per unit area of the droplets since droplets are disposed throughout the area of the cone impinging upon the item being washed and not just within an annular band of the cone of water. Yet, the quantity of washing fluid impinging upon the produce may be the same or more than that emanating from a conventional nozzle.

Because individual droplets 340 impinge upon the element being washed, repetitive impact forces will impinge upon debris and other foreign matter present. Such impacts will tend to agitate, scour and dislodge debris and foreign matter from the element being washed. As the impact forces are relatively low, damage to the element being washed due to the impacts is relatively unlikely. The substantial quantity of water or washing fluid per unit area will tend to cause scouring flotation and carrying away of dislodged debris and foreign matter. Such agitation, scouring and flotation will be present in crevices, depressions and even folds of the element being washed and difficult to clean produce, such as lettuce and broccoli can be readily cleaned. Because of the low impact forces and low probability of damage, soft tissue produce, such as strawberries and other fruits or vegetables, are readily washed clean without ripping or tearing of the outside skin.

For reasons not fully understood, it has been found useful to add a weak acidic solution to the wash water initially placed within the trough of the produce washer. For example, the juice squeezed from half a lemon or a small quantity of lemon abstract along with about a tablespoon of common salt ($N_aCl$) poured upon the screen or into the trough prior to the washing cycle provides somewhat better cleaning than plain tap water. This suggested cleaning solution is equivalent to a mild hydrochloric acid solution and is a very effective cleaning solution. Where readily available tap water may be contaminated, it is suggested that purified water be used as the washing fluid.

Produce, whether vegetables or fruits, vary significantly in robustness. Moreover, the degree and type of debris and contaminants present vary significantly. To accommodate such range of variations, the control panel of the produce washer provides the capability of varying the water flow rates through the nozzles to increase or decrease the impact forces of the impinging droplets. Typically, the flow rate of the recycling washing fluid is 7-9 gallons per minute and the pressure at the nozzles is in the range of 100-110 psi. Usually, only 1 to 1½ gallons of washing fluid is consumed per washing cycle. These ranges of flow rate, pressure and volume would also be applicable to the rinse cycle. Further controls are provided to lengthen or shorten the wash cycle and/or rinse cycle to perform the washing and the rinsing operations as efficiently as possible.

As representatively illustrated in FIGS. 2 and 4, wires 350 and electrical conductors or cables 352 may be routed through the space between the exterior walls of the cabinet and the false walls of the compartment. Similarly, as illustrated in FIGS. 5, 7 and 10, conduits of plumbing trees 92, 140 and 170, may be routed in the spaces between the exterior walls of the cabinet and the false walls of the compartment. The pump and associated valving, when present, may be located in the space between the bottom of the trough and the bottom of the cabinet. The electrical conductors, the respective locations of any electrical connectors, the plumbing conduits and plumbing fixtures are shielded from the water or washing fluid by the false walls of the compartment in combination with the seals disposed about the nozzles and related structure at the point of penetration into the washing compartment.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for washing produce within a compartment, said apparatus comprising in combination:
    a) a support for supporting the produce within the compartment;
    b) a source of washing fluid at an ambient temperature;
    c) a plurality of orifices for directing sprays of droplets of washing fluid dispersed throughout expanding cones of the spray within the compartment and upon the produce;
    d) a pump for pumping washing fluid from said source to said plurality of orifices;
    e) conduit means for interconnecting said pump with said plurality of orifices to convey washing fluid from said pump to said plurality of orifices;
    f) a filter for filtering washing fluid draining from the produce; and
    g) conveying means for channeling the filtered washing fluid to said source to accommodate recycling of the washing fluid.

2. The apparatus as set forth in claim 1 wherein said plurality of orifices comprises a plurality of nozzles.

3. The apparatus as set forth in claim 1 wherein said pump and said conduit means is external of said compartment.

4. The apparatus as set forth in claim 3 including a cabinet for enveloping said compartment, said pump and said conduit means.

5. The apparatus as set forth in claim 1 including control means for controlling the operation of said pump means.

6. The apparatus as set forth in claim 1 wherein the washing fluid comprises an acidic solution.

7. The apparatus as set forth in claim 1 wherein the washing fluid comprises an acidic aqueous solution.

8. Apparatus for washing produce at an ambient temperature with an aqueous washing fluid within a compartment, said apparatus comprising in combination:
    a) a washing fluid permeable support for supporting the produce within the compartment;
    b) a source of the aqueous washing fluid;
    c) a plurality of orifices for ejecting sprays of droplets of the aqueous washing fluid, which droplets are dispensed throughout the expanding cone of the spray ejected from each of said plurality of orifices and for directing the expanding cones of spray upon the produce within the compartment;
    d) a pump in fluid communication with each orifice of said plurality of orifices for pumping the aqueous washing fluid from said source to each orifice of said plurality of orifices;

e) a filter for filtering the aqueous washing fluid draining from the produce; and f) conveying means for conveying the filtered aqueous washing fluid to said source.

9. The apparatus as set forth in claim 8 wherein the aqueous washing fluid is slightly acidic.

10. The apparatus as set forth in claim 8 including lemon juice added to the aqueous washing fluid to render the Ph of the aqueous washing fluid acidic.

11. The apparatus as set forth in claim 8 including a control panel for controlling the operation of said pump.

12. The apparatus as set forth in claim 8 including a drain for discharging the aqueous washing fluid from the compartment.

13. The apparatus as set forth in claim 12 including an openable door for inserting within the compartment and removing from the compartment the produce.

14. The apparatus as set forth in claim 8 wherein at least one orifice of said plurality of orifices is movable within the compartment during ejection of spray from said one orifice.

15. The apparatus as set forth in claim 8 including an arm rotatably mounted within the compartment for supporting at least one orifice of said plurality of orifices, said arm being rotatable in response to ejection of aqueous washing fluid from said one orifice.

16. The apparatus as set forth in claim 8 including mounting means for movably supporting at least one orifice of said plurality of orifices to spray the produce in a random pattern as a function of the movement of said one orifice.

17. The apparatus as set forth in claim 16 wherein said mounting means is a rotatably mounted arm in fluid communication with said pump for supporting several orifices of said plurality of orifices.

* * * * *